(12) United States Patent
Tang et al.

(10) Patent No.: US 11,099,568 B2
(45) Date of Patent: Aug. 24, 2021

(54) SELF-DRIVING VEHICLE SYSTEM WITH RETRACTABLE SENSOR HEAD

(71) Applicant: LINGDONG TECHNOLOGY (BEIJING) CO. LTD, Beijing (CN)

(72) Inventors: Yaming Tang, Beijing (CN); Liang Han, Beijing (CN); Chiung Lin Chen, Beijing (CN)

(73) Assignee: LINGDONG TECHNOLOGY (BEIJING) CO. LTD, Beijing (CN)

( * ) Notice: Subject to any disclaimer, the term of this patent is extended or adjusted under 35 U.S.C. 154(b) by 392 days.

(21) Appl. No.: 16/084,184

(22) PCT Filed: Sep. 6, 2018

(86) PCT No.: PCT/CN2018/104283
§ 371 (c)(1),
(2) Date: Sep. 11, 2018

(87) PCT Pub. No.: WO2020/047792
PCT Pub. Date: Mar. 12, 2020

(65) Prior Publication Data
US 2020/0326712 A1   Oct. 15, 2020

(51) Int. Cl.
*G05D 1/02* (2020.01)
*G06K 9/00* (2006.01)

(52) U.S. Cl.
CPC ....... *G05D 1/0212* (2013.01); *G06K 9/00201* (2013.01); *G06K 9/00805* (2013.01); *G05D 2201/0216* (2013.01)

(58) Field of Classification Search
CPC ......... G05D 1/0212; G05D 2201/0216; G05D 1/02; G06K 9/00201; G06K 9/00805
See application file for complete search history.

(56) References Cited

U.S. PATENT DOCUMENTS

| | | | |
|---|---|---|---|
| 10,271,623 B1 | 4/2019 | Qi et al. | |
| 10,310,506 B1 | 6/2019 | Qi et al. | |
| 10,423,159 B1 | 9/2019 | Qi et al. | |
| 10,477,933 B1 | 11/2019 | Qi et al. | |
| 10,646,015 B1 | 5/2020 | Qi et al. | |
| 10,649,465 B1 | 5/2020 | Tang et al. | |
| 2014/0074341 A1 | 3/2014 | Weiss | |
| 2016/0158942 A1* | 6/2016 | Augenbraun | B25J 9/1694 700/253 |

(Continued)

FOREIGN PATENT DOCUMENTS

| CN | 205201503 U | 5/2016 |
|---|---|---|
| CN | 205852772 U | 1/2017 |

(Continued)

OTHER PUBLICATIONS

International Search Report dated Jan. 24, 2019 for Application No. PCT/CN2018/104283.

*Primary Examiner* — Marthe Y Marc-Coleman
(74) *Attorney, Agent, or Firm* — Patterson + Sheridan, L.L.P.

(57) ABSTRACT

A self-driving vehicle system comprising a body having one or more motorized wheels, and a sensor head coupled to the body. The sensor head is movable from a retracted position to an extended position relative to the body. The sensor head comprises one or more proximity sensors and one or more cameras.

20 Claims, 8 Drawing Sheets

(56) References Cited

U.S. PATENT DOCUMENTS

| | | |
|---|---|---|
| 2016/0327383 A1 | 11/2016 | Becker et al. |
| 2017/0182664 A1* | 6/2017 | Watts ................... H04L 67/10 |
| 2017/0191822 A1 | 7/2017 | Becker et al. |
| 2018/0029797 A1* | 2/2018 | Hance ................... G06Q 10/087 |
| 2018/0072212 A1* | 3/2018 | Alfaro ................... G05D 1/0278 |
| 2019/0310655 A1* | 10/2019 | Voorhies ................ B66F 9/063 |
| 2020/0022472 A1 | 1/2020 | Qi et al. |
| 2020/0068126 A1* | 2/2020 | Fink ....................... H04N 5/247 |
| 2020/0229569 A1 | 7/2020 | Qi et al. |

FOREIGN PATENT DOCUMENTS

| | | |
|---|---|---|
| CN | 107428008 A | 12/2017 |
| JP | 2010070319 A | 4/2010 |
| WO | 2018129316 A1 | 7/2018 |

* cited by examiner

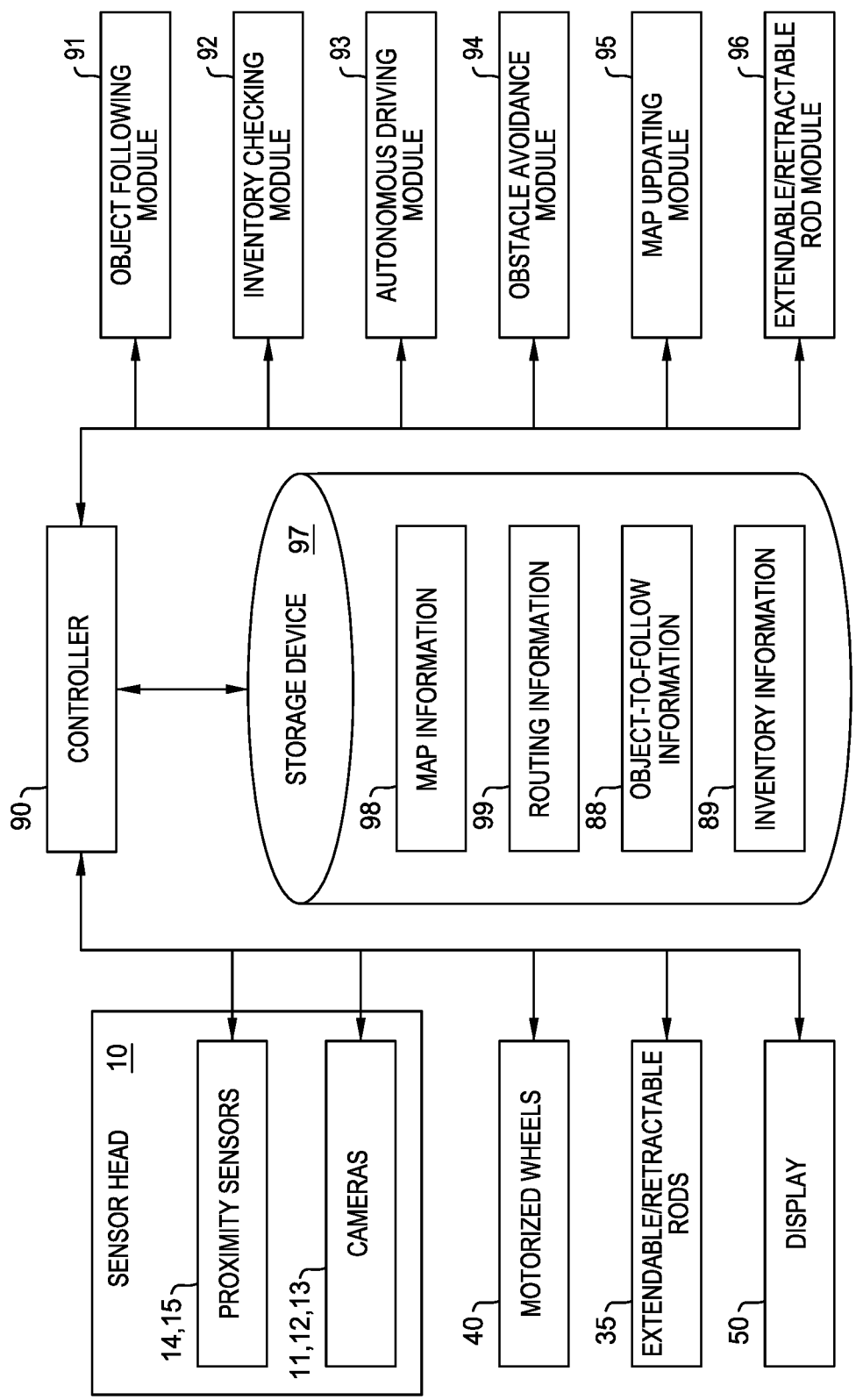

SELF-DRIVING VEHICLE SYSTEM WITH RETRACTABLE SENSOR HEAD

BACKGROUND

Field

Embodiments disclosed herein relate to a self-driving vehicle system with retractable sensor head.

Description of the Related Art

Automated guided vehicles (AGVs) are autonomous self-driving vehicles used in a variety of different environments. For example, AGVs are used in warehouses to assist with moving inventory from one area to another. However, one problem that operators face is when there is a change in the arrangements or heights of the shelves that store such inventory, the AGVs have to be taken offline and reprogrammed to account for such changes. Another problem is that the AGVs cannot detect when inventory is placed on the AGV or even the quantity or type of inventory. A further problem is that the AGVs cannot detect obstacles located behind the AGV when moving in reverse. These problems often result in a reduction in productivity and efficiency, as well as potential safety hazards.

Therefore, there exists a need for new and improved self-driving vehicle systems.

SUMMARY

In one embodiment, a self-driving system comprises a body having one or more motorized wheels; and a sensor head coupled to the body and movable from a retracted position to an extended position relative to the body, wherein the sensor head comprises one or more proximity sensors.

In one embodiment, a self-driving system comprises a body having one or more motorized wheels; and a sensor head coupled to the body, wherein the sensor head comprises one or more side facing cameras, rear facing cameras, or down facing cameras.

BRIEF DESCRIPTION OF THE DRAWINGS

FIG. 8 is a block diagram of the AGV according to one embodiment.

To facilitate understanding, identical reference numerals have been used, where possible, to designate identical elements that are common to the figures. It is contemplated that elements disclosed in one embodiment may be beneficially utilized with other embodiments without specific recitation.

DETAILED DESCRIPTION

Embodiments of the disclosure include self-driving systems having one or more shelf detection proximity sensors, rear detection proximity sensors, side facing cameras, rear facing cameras, down facing cameras, and any combination of these sensors and cameras. Automated guided vehicles (AGVs) are self-driving vehicles that include but are not limited to mobile robots, such as autonomously-navigating mobile robots, inertially-guided robots, remote-controlled mobile robots, and/or robots guided by laser targeting, vision systems, and/or roadmaps. Although the embodiments of the self-driving systems are described and illustrated herein with respect to AGVs moving inventory in a warehouse environment, the embodiments may be used with any type of self-driving systems in any type of environment.

Figure 1:
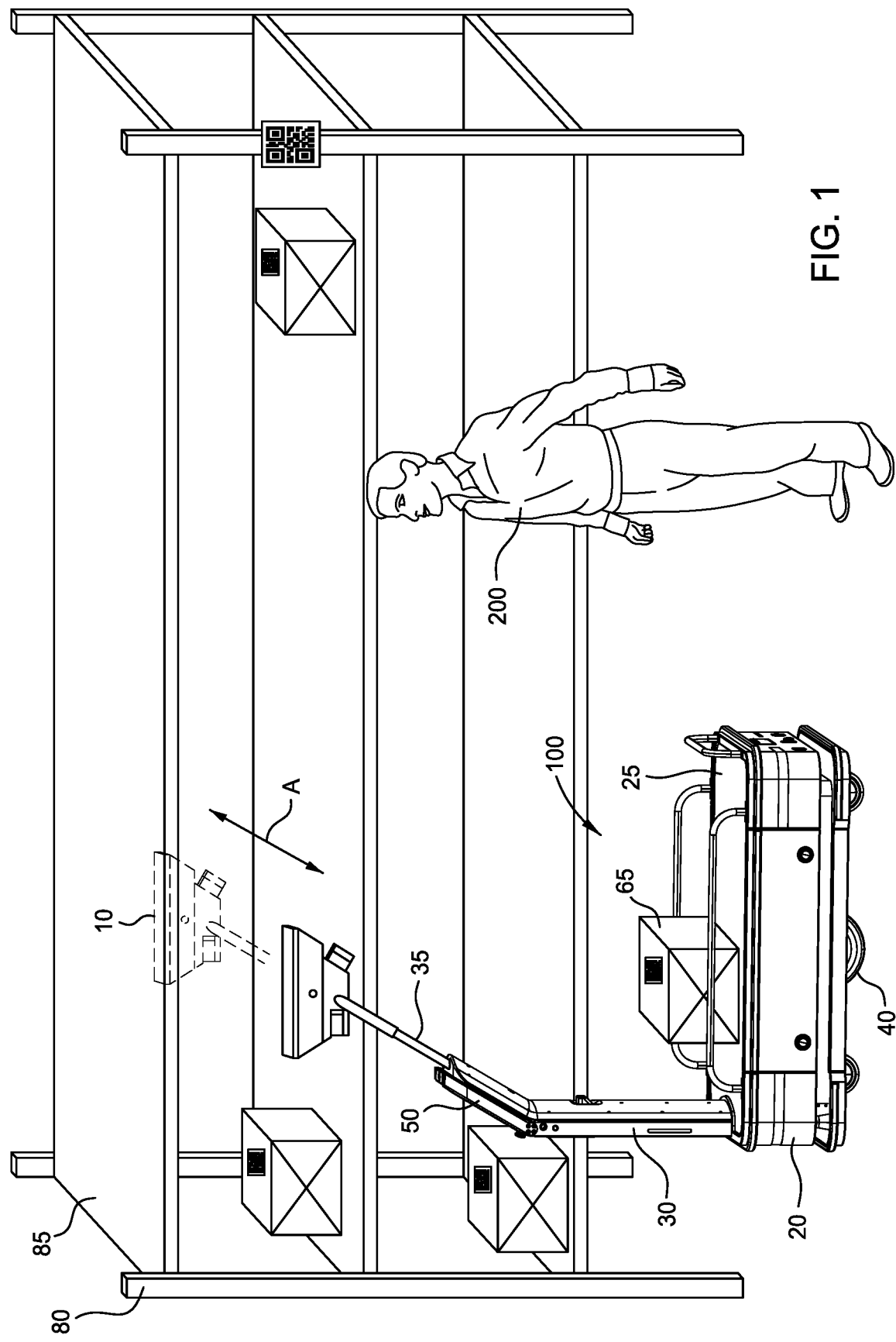
FIG. 1 is a side view of an automated guided vehicle (AGV) having a retractable sensor head according to one embodiment.

FIG. 1 is a side view of an automated guided vehicle (AGV) 100 according to one embodiment. The AGV 100 includes a body comprising a console 30 coupled in an upright positon to a front end of a mobile base 20. The console 30 has a display 50 configured to display information and/or allow an operator 200 to control the operation of the AGV 100. The mobile base 20 has a plurality of motorized wheels 40 configured to rotate and/or roll in any given direction to move the AGV 100. The mobile base 20 has an upper surface 25 that can be used to support inventory 65. The AGV 100 is configured to move inventory 65 to and from different locations, such as to and from a storage rack 80 having one or more shelves 85.

The AGV 100 includes a sensor head 10 that is shown coupled to the console 30 by one or more extendable/retractable rods 35 configured to move the sensor head 10 between a retracted position and an extended position as shown by reference arrow A. The sensor head 10 is movable by the extendable/retractable rods 35 in both the vertical direction and the horizontal direction relative to the console 30 and the mobile base 20. The sensor head 10 can be extended and moved to a higher position (or retracted and moved to a lower position) to prevent inventory or other objects from obstructing sensors and cameras coupled to the sensor head 10 during operation. The sensor head 10 can also be moved higher or lower to detect the location of one or more shelves of different storage racks.

Figure 2:
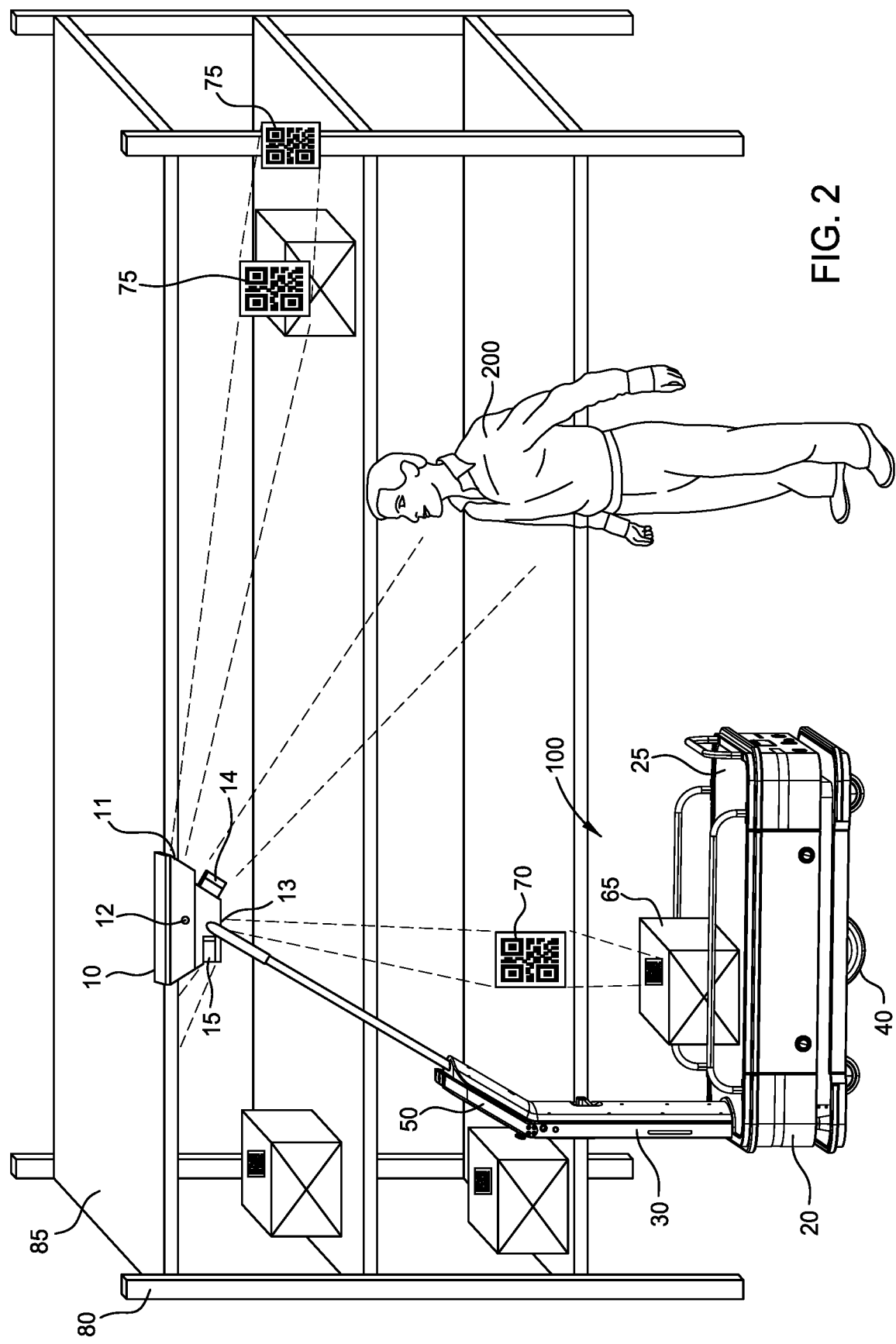
FIG. 2 is another side view of the AGV according to one embodiment.

FIG. 2 is another side view of the AGV 100. The sensor head 10 of the AGV 100 may include one or more rear facing cameras 11, one or more side facing cameras 12, one or more down facing cameras 13, one or more rear detection proximity sensors 14, and/or one or more shelf detection proximity sensors 15. Any number or arrangement of side, rear, and down facing cameras 11, 12, 13, as well as any number or arrangement of rear detection and shelf detection proximity sensors 14, 15 can be used with the AGV 100. The rear detection proximity sensors 14 and/or the shelf detection proximity sensors 15 are configured to detect the presence of nearby objects and may include sonar sensors, infrared sensors, radar sensors, and/or LiDAR sensors.

The rear detection proximity sensors 14 are configured to detect objects located behind the AGV 100, such as one or more operators 200 and/or one or more inventory 65. For example, the rear detection proximity sensors 14 can be used to help prevent the AGV 100 from inadvertently contacting an object located behind the AGV 100, such as by avoiding an obstacle when the AGV 100 is moving in reverse. The shelf detection proximity sensors 15 are configured to detect a location of the shelf 85 and/or a location of an object on the shelf 85. For example, the sensor head 10 can be raised and lowered by the extendable/retractable rods 35 until the shelf detection proximity sensors 15 detect the location of the shelf 85 and/or the location of an object on the shelf 85.

The rear facing cameras 11 are configured to detect and record an images of objects located behind the AGV 100, such as one or more markers 75, one or more operators 200, and/or one or more inventory 65. The side facing cameras 12 are configured to detect and record images of objects located on the sides of the AGV 100, such as one or more markers 75, one or more operators 200, and/or one or more inventory 65. The down facing cameras 13 are configured to detect and record images of objects located on the AGV 100, such as one or more markers 70 and/or one or more inventory 65. The markers 70, 75 can be barcodes and attached to any object, such as the storage rack 80, the shelf 85, and/or the inventory 65.

Figure 3:
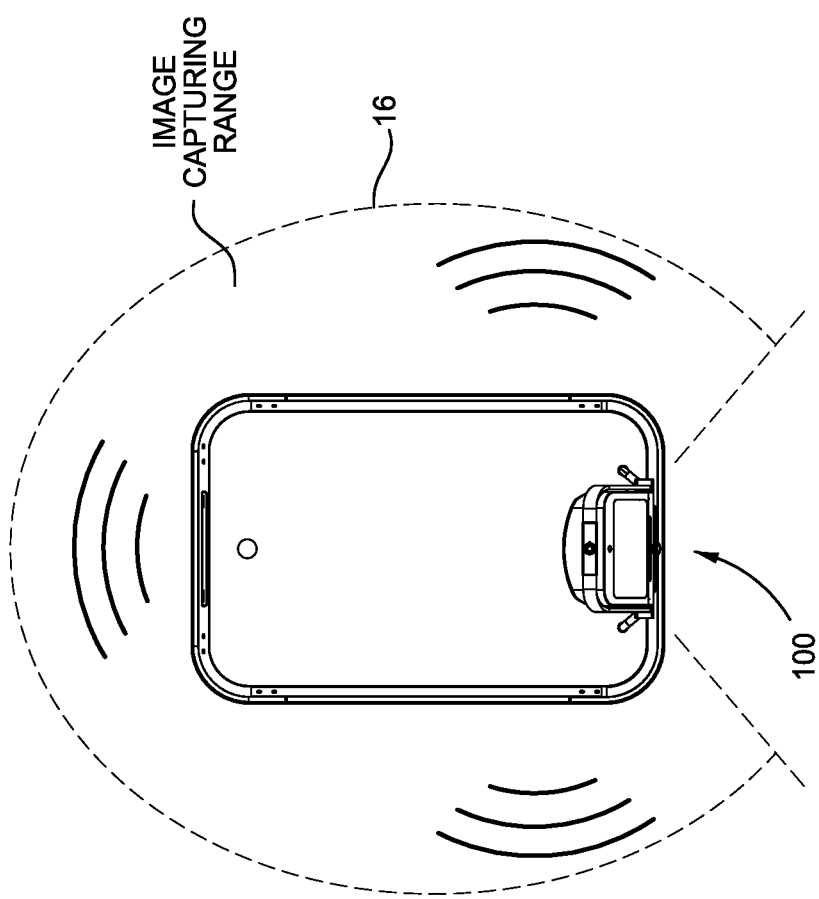
FIG. 3 is a top view of the AGV according to one embodiment.

As shown in FIG. 3, the side, rear, and down facing cameras 11, 12, 13 are located on the AGV 100 to provide an image capturing range 16 that includes areas slightly in the front of the AGV 100, on both sides of the AGV 100, and behind the AGV 100. The image capturing range 16 may include a 180 degree viewing area, a 270 degree viewing area, a 360 degree viewing area, or any viewing area between 180 degrees and 360 degrees. The side, rear, and down facing cameras 11, 12, 13 are configured to detect and record images of nearby objects. The cameras 30 may include but are not limited to a monocular camera, a binocular camera, and/or a stereo camera.

Figure 4:
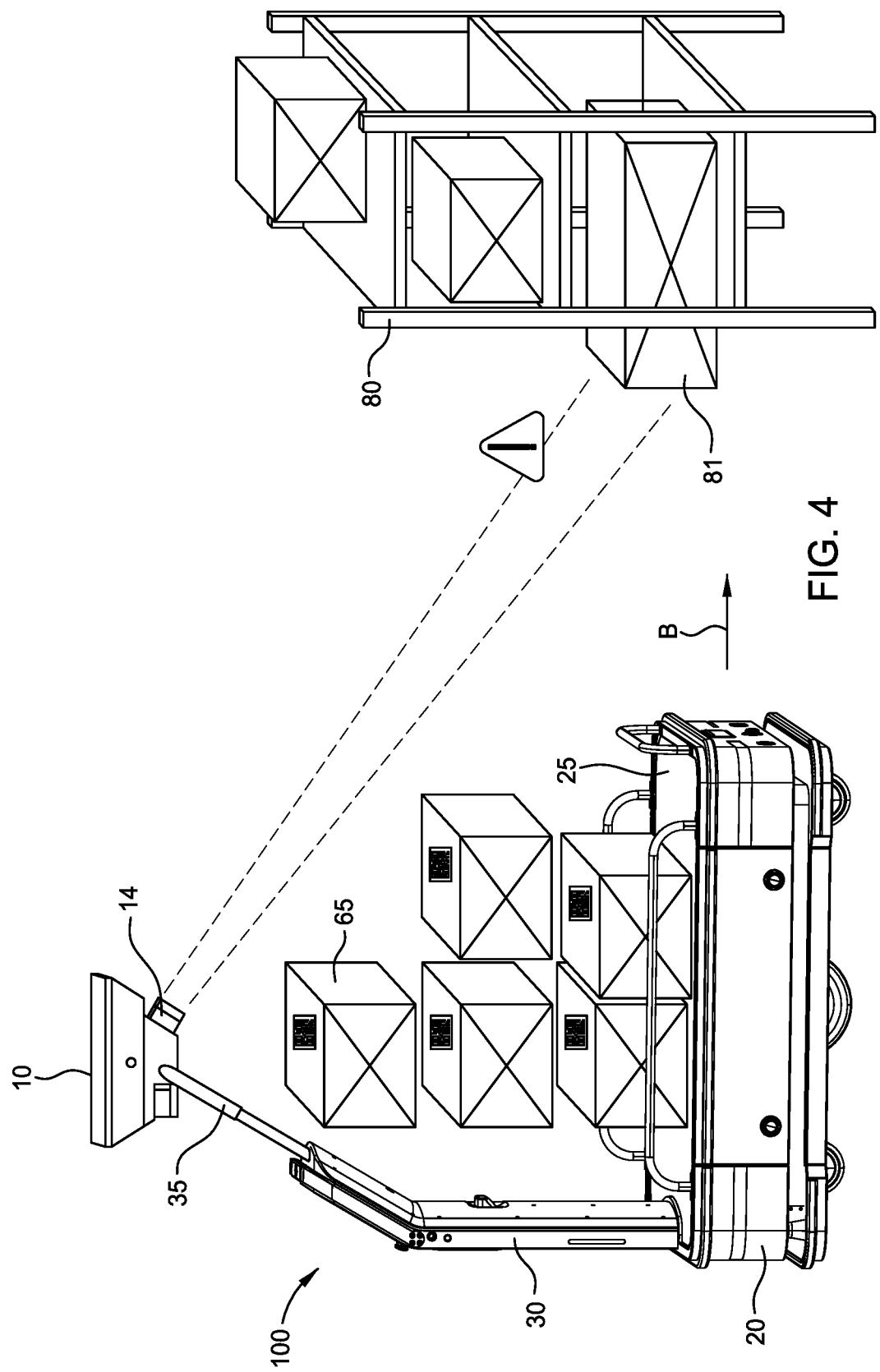
FIG. 4 is a schematic view of the AGV detecting an object located behind the AGV according to one embodiment.

FIG. 4 is a schematic view of the rear detection proximity sensor 14 of the AGV 100 detecting an object 81 located behind the AGV 100. The AGV 100 can be stationary or moving in reverse as indicated by reference arrow B. The object 81 is located on the storage rack 80 in a position where the AGV 100 may inadvertently contact the object 81 and potentially damage the object 81, the AGV 100, and/or the storage rack 80, as well as cause any of these objects to fall over and potentially harm nearby operators.

The sensor head 10 is shown in an extended position by the extendable/retractable rods 35 so that the rear detection proximity sensor 14 is not obstructed by the inventory 65 that is located on the upper surface 25 of the mobile base 25. The rear detection proximity sensor 14 can be used to detect the object 81 located behind the AGV 100 and thereby prevent the AGV 100 from contacting the object 81. Although the object 81 is shown as inventory, the object 81 could be an operator.

Figure 5:
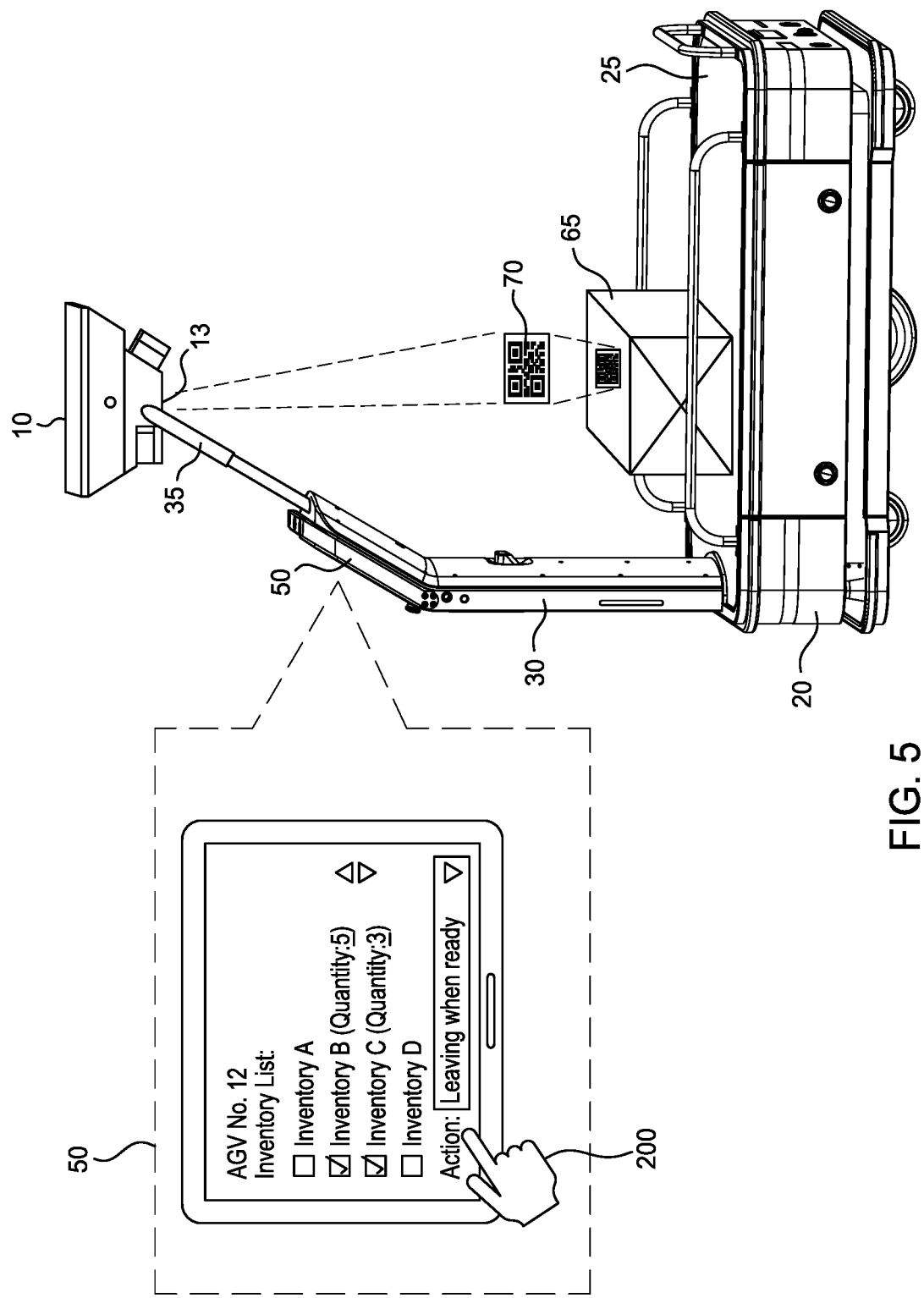
FIG. 5 is a schematic view of the AGV detecting and displaying inventory information according to one embodiment.

FIG. 5 is a schematic view of the down facing camera 13 of the AGV 100 detecting and recording one or more markers 70 attached to the inventory 65 located on the upper surface 25 of the mobile base 20. The marker 70 can provide inventory information, including but not limited to the type of inventory, the quantity of inventory, and/or any instructions related to the inventory, such routing and/or task instructions associated with the inventory 65 and/or the AGV 100. The sensor head 10 can be extended and retracted by the extendable/retractable rods 35 to move the down facing camera 13, if needed, into a position to detect and record any markers 70 attached to any inventory 65 located on the upper surface 25 of the mobile base 20.

Referring to FIG. 5, the operator 200 can instruct the AGV 100 to go to a specific destination, retrieve a specific list of inventory, and then perform a specific task with the inventory. The display 50 can be touch screen so that the operator 200 can select from a list or input the destination, the inventory, and/or the task. According to one example, the operator 200 can view and select from a list of inventory (e.g. Inventory A, Inventory B, Inventory C, Inventory D, etc.) displayed on the display 50, as well as select a quantity of each inventory, to be retrieved. The operator 200 can also select from a list of tasks for the AGV 100 to perform, such as "Leaving when ready". Once the AGV 100 has arrived at the destination and the inventory has been loaded onto the AGV 100, then the AGV 100 is configured to obtain the inventory information from the markers 70 attached to the inventory using the down facing camera 13 to determine that the correct inventory has been received. The inventory information captured by the down facing camera 13 can be displayed on the display 50 of the AGV 100 for reference by any operator 200. Once the AGV 100 has determined that the correct inventory has been received, then AGV 100 is configured to automatically perform the task, such as leave to take the inventory to another location.

Figure 6:
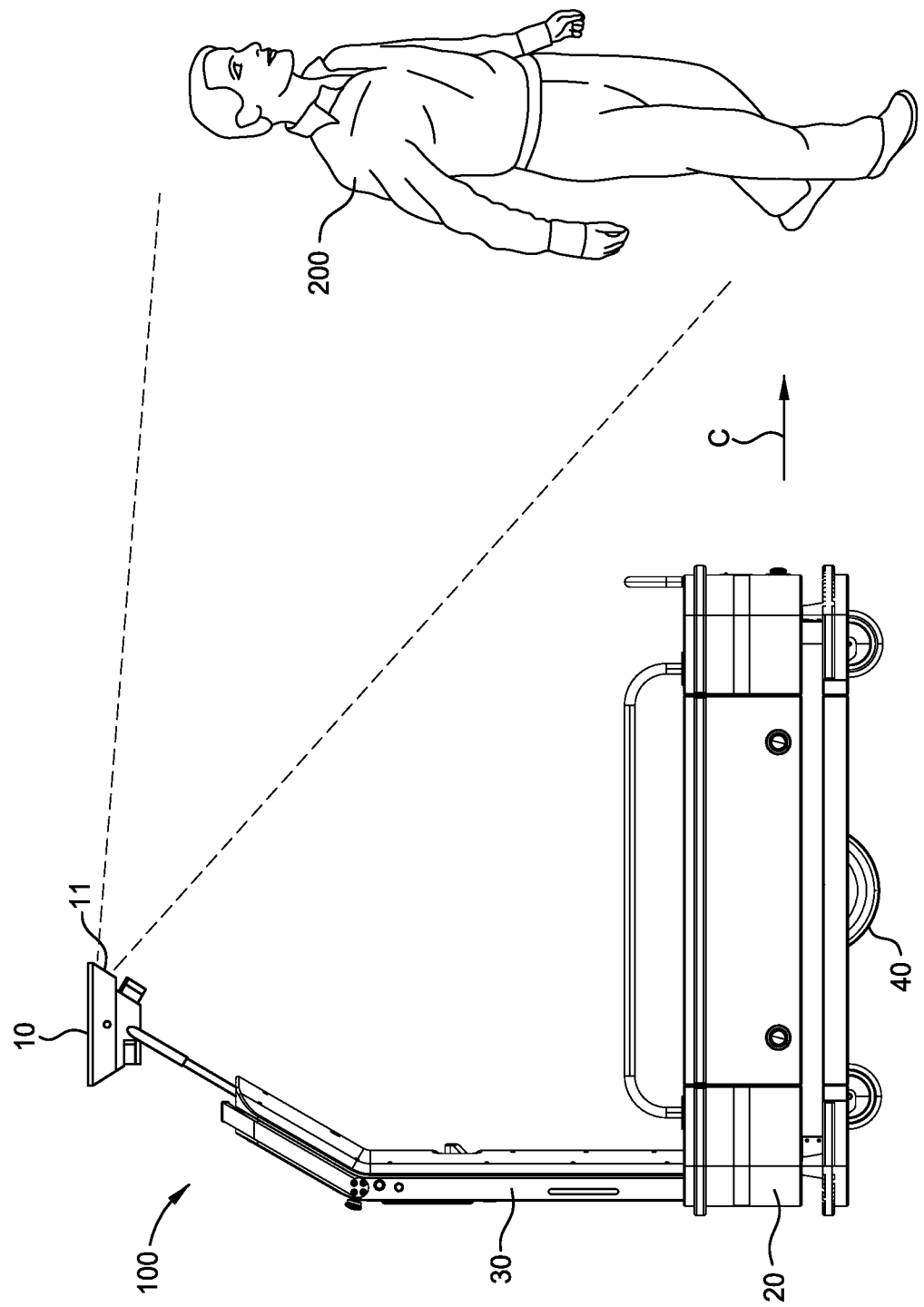
FIG. 6 is a schematic view of the AGV following an object located and moving behind the AGV while the AGV is moving in reverse according to one embodiment.

FIG. 6 is a schematic view of the AGV 100 following an operator 200 that is located and moving behind the AGV 100 while the AGV 100 is moving in reverse as indicated by reference arrow C. The rear facing camera 11 is configured to detect and record an image of the operator 200 while the operator 200 is stationary or moving. The image may include a shape of the operator 200, a pose of the operator 200, the clothing of the operator 200, or the color of the operator 200. Based on the image captured by the rear facing camera 11, the AGV 100 is configured to follow the operator 200 in a rear follow position. Specifically, the AGV 100 is configured to maintain a predetermined distance from the operator 200 while the operator 200 is moving and while the AGV 100 is moving in reverse.

Figure 7:
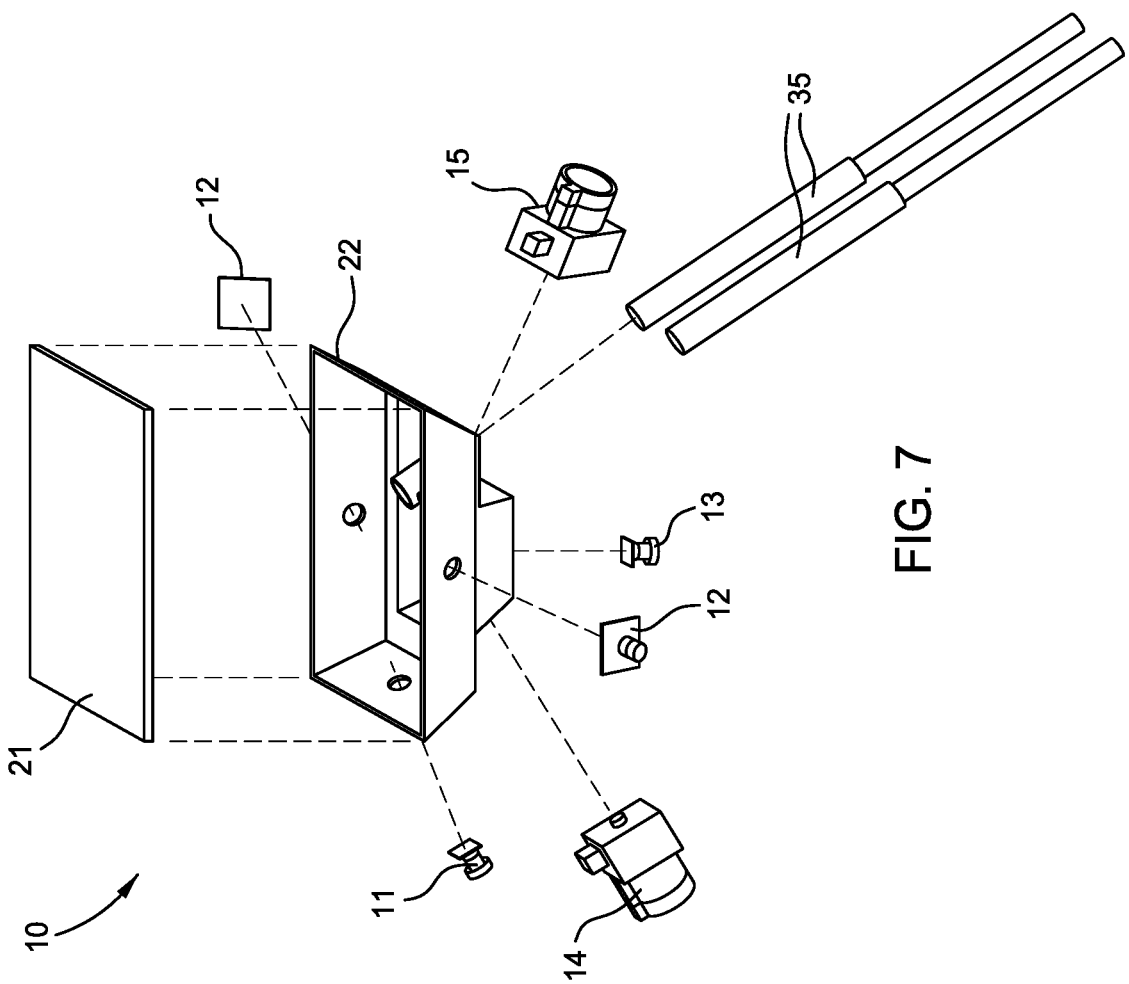
FIG. 7 is an exploded view of a housing of the sensor head of the AGV according to one embodiment.

FIG. 7 is an exploded view of the sensor head 10 according to one embodiment. The sensor head 10 includes a housing 22 having a top cover 21. The sensor head 10 is moveable between an extended position and a retracted position by the extendable/retractable rods 35, which are coupled at one end to the housing 22 and at an opposite end to the console 30. The rear facing camera 11, the side facing cameras 12, and the down facing camera 13 are coupled to the housing 22. The rear detection proximity sensor 14 and the shelf detection proximity sensor 15 are also coupled to the housing 22.

FIG. 8 is a block diagram of the AGV 100 according to one embodiment. The AGV 100 includes a controller 90 in communication with a storage device 97 containing data regarding map information 98, routing information 99, object-to-follow information 88, and inventory information 89. The controller 90 is also in communication with several modules configured to control the operation of the AGV 100. The modules include an object following module 91, an inventory checking module 92, an autonomous driving module 93, an obstacle avoidance module 94, a map updating module 95, and an extendable/retractable rod module 96.

The controller 90, the modules, and/or the data contained on the storage device 97 are configured to control the motorized wheels 40, the extendable/retractable rods 35, and/or the information displayed on the display 50, all based at least in part on the information received from the proximity sensors 14, 15 and/or the cameras 11, 12, 13. The controller 90 is configured to analyze the information received or retrieved from the cameras 11, 12, 13, the proximity sensors 14, 15, the data on the storage device 97, and/or any of the modules and in response control the operation of the AGV 100, including the motorized wheels 40, the extendable/retractable rods 35, and/or the information displayed on the display 50.

In one embodiment, the controller 90 is configured to receive information from the shelf detection proximity sensor 14 regarding the presence or absence of a shelf, and communicate with the extendable/retractable module 96 to determine if the location of a shelf has been detected. If no shelf has been detected, the controller 90 is configured to actuate the extendable/retractable rods 35 to extend or retract the sensor head 10 until the location of the shelf is detected by the shelf detection proximity sensor 14. Once the shelf is detected, the controller 90 is configured to stop the actuation of the extendable/retractable rods 35 to stop the sensor head 10 at the location of the shelf.

Information regarding the location of the shelf can be stored on the storage device 97 and accessed by the controller 90 and/or an operator for future reference as needed. At any time, the controller 90 can retrieve data from the information stored on the storage device 97, including the map information 98, the routing information 99, the object-to-follow information 88, and/or the inventory information 89 to help determine the location of the shelf. If the shelf and/or the AGV 100 is moved to a position where the shelf detection proximity sensor 14 no longer detects the shelf, the AGV 100 may continue operation and the process above may be repeated until the shelf or another shelf is detected by the shelf detection proximity sensor 14.

In one embodiment, the controller 90 is configured to receive information from the rear detection proximity sensor 15 (and/or the rear or side facing cameras 11, 12) regarding the presence or absence of an object located behind the AGV 100, and communicate with the autonomous driving module 93 and/or the obstacle avoidance module 94 to determine if an object has been detected. If no object has been detected, the controller 90 is configured to actuate the motorized wheels 40 to move the AGC 100 in the desired reverse direction until an object is detected by the rear detection proximity sensor 15. Once an object is detected, the controller 90 is configured to communicate with the autonomous driving module 93 and/or the obstacle avoidance module 94 to determine if the AGV 100 should be stopped or moved in a different reverse direction to avoid contacting the object. The controller 90 is configured to actuate the motorized wheels 40 to stop the AGV 100 or move the AGV 100 in a different reverse direction to avoid the object.

Information regarding the location of the object can be stored on the storage device 97 and accessed by the controller 90 and/or an operator for future reference as needed. At any time, the controller 90 can retrieve data from the information stored on the storage device 97, including the map information 98, the routing information 99, the object-to-follow information 88, and/or the inventory information 89 to help determine if an object is located behind the AGV 100 and/or whether to stop or move in a different reverse direction to prevent the AGV 100 from contacting the object. After the object has passed, the AGV 100 may continue operation and the process above may be repeated until another object is detected by the rear detection proximity sensor 15. The object may be an operator, inventory, an obstacle, another AGV, or any other object that the AGV 100 may encounter during operation.

In one embodiment, the controller 90 is configured to receive information from the rear facing camera 11, the side facing camera 12, and/or the down facing camera 13 whether one or more markers attached to an object (such as markers 70 attached to inventory 65 or markers 75 attached to storage rack 80) has been detected, and communicate with the inventory checking module 92 and/or the inventory information 89 stored on the storage device 97 to identify which marker has been detected. The marker may be attached to an object that is located behind the AGV 100, on either side of the AGV 100, or on the upper surface 25 of the mobile base 20 of the AGV 100. Once the marker has been identified, the controller 90 is configured to communicate with the inventory checking module 92 and/or the inventory information 89 stored on the storage device 97 to retrieve the inventory information and display the inventory information on the display 50 of the AGV 100. The controller 90 is also configured to compare the inventory information with a list and quantity of inventory preselected by an operator to determine that the correct inventory has been received or detected by the AGV 100.

Information regarding the inventory can be stored on the storage device 97 with the inventory information 89 and accessed by the controller 90 and/or an operator for future reference as needed. At any time, the controller 90 can retrieve data from the information stored on the storage device 97, including the map information 98, the routing information 99, the object-to-follow information 88, and/or the inventory information 89 to help detect the marker and identify the inventory information associate with the marker. The AGV 100 may continue operation and the process above may be repeated for any number of markers (such as barcodes) attached to any object (such as inventory or a storage rack storing inventory).

In one embodiment, the controller 90 is configured to receive information from the rear facing camera 11 whether an object-to-follow located behind the AGV 100 has been detected, and communicate with the object following module 91, the autonomous driving module 93, and/or the object-to-follow information 88 stored on the storage device 97 to determine if an object-to-follow has been detected. Once an object-to-follow has been detected, the controller 90 is configured to communicate with the object following module 91, the autonomous driving module 93, and/or the object-to-follow information 88 stored on the storage device 97 to maintain the AGV 100 within a predetermined distance of the object-to-follow, based on images of the object as detected and recorded by the rear facing camera 11 while the object is moving behind the AGV 100 and while the AGV 100 is moving in reverse. The controller 90 is configured to actuate the motorized wheels 40 to maintain the AGV 100 within the predetermined distance of the object-to-follow.

Information regarding the object-to-follow can be stored on the storage device 97 with the object-to-follow information 88 and accessed by the controller 90 and/or an operator for future reference as needed. At any time, the controller 90 can retrieve data from the information stored on the storage device 97, including the map information 98, the routing information 99, the object-to-follow information 88, and/or the inventory information 89 to help detect the object-to-follow and maintain the AGV 100 within the pre-determined distance. The AGV 100 may continue operation and the process above may be repeated for another object-to-follow as detected by the rear facing camera 11. The rear facing camera 11 can detect the object-to-follow based on images of the object-to-follow, which may include a shape of the object, a pose of the object, a clothing of the object, or a color of the object. The object may be an operator or another AGV.

In one embodiment, the controller 90 is configured to receive information from any of the cameras 11, 12, 13 and sensors 14, 15, and communicate with the autonomous driving module 93, the obstacle avoidance module 94, the map updating module 95, the map information 98 stored on the storage device 97, and/or the routing information 99 stored on the storage device 97 to determine a route to follow to perform a task, while the AGV 100 is moving in reverse. Once the route has been determined, the controller 90 is configured to communicate with the autonomous driving module 93, the obstacle avoidance module 94, the map updating module 95, the map information 98 stored on the storage device 97, and/or the routing information 99 stored on the storage device 97 to maintain the AGV 100 on the route while the AGV 100 is moving in reverse. The controller 90 is configured to actuate the motorized wheels 40 to maintain the AGV 100 on the route while moving in the reverse direction.

Information regarding the route can be stored on the storage device 97 with the map information 98 and/or the routing information 99 and accessed by the controller 90 and/or an operator for future reference as needed. At any time, the controller 90 can retrieve data from the information stored on the storage device 97, including the map information 98, the routing information 99, the object-to-follow information 88, and/or the inventory information 89 to help determine a route to follow to perform a task. The AGV 100 may continue operation and the process above may be repeated for any other task.

Embodiments of the self-driving system include any combination of the above embodiments or processes to conduct any type of task as needed using the AGV 100.

While the foregoing is directed to embodiments of the disclosure, other and further embodiments of the disclosure thus may be devised without departing from the basic scope thereof, and the scope thereof is determined by the claims that follow.

The invention claimed is:

1. A self-driving system, comprising:
a body having one or more motorized wheels and an upper surface to support inventory thereon; and
a sensor head coupled to the body and movable from a retracted position to an extended position relative to the body, the sensor head comprising:
a front face,
a side face,
a bottom face,
a rear face,
one or more down facing cameras disposed on the bottom face and configured to detect and record an image of one or more markers attached to the inventory supported on the body, and
one or more proximity sensors.

2. The self-driving system of claim 1, wherein the body includes a console coupled in an upright positon to a mobile base, and wherein the sensor head is coupled to the console.

3. The self-driving system of claim 1, wherein the sensor head is coupled to the body by one or more extendable and retractable rods.

4. The self-driving system of claim 1, wherein the proximity sensors include shelf detection proximity sensors configured to detect a location of a shelf.

5. The self-driving system of claim 4, further comprising a controller coupled to the body and configured to receive information from the shelf detection proximity sensors, wherein the controller is configured to extend or retract the sensor head until the location of the shelf is detected by the shelf detection proximity sensors.

6. The self-driving system of claim 1, wherein the proximity sensors are rear detection proximity sensors configured to detect an object located behind the body.

7. The self-driving system of claim 6, further comprising a controller coupled to the body and configured to receive information from the rear detection proximity sensors, wherein the controller is configured to prevent the body from contacting the object located behind the body based on information received from the rear detection proximity sensors while the body is moving in reverse.

8. A self-driving system, comprising:
a body having one or more motorized wheels and an upper surface to support inventory thereon; and
a sensor head coupled to the body, the sensor head comprising:
a front face,
a side face,
a bottom face,
a rear face,
one or more side facing cameras disposed on the side face, one or more rear facing cameras disposed on the rear face, or one or more front facing cameras disposed on the front face, and
one or more down facing cameras disposed on the bottom face and configured to detect and record an image of one or more markers attached to the inventory supported on the body.

9. The self-driving system of claim 8, wherein the body includes a console coupled in an upright positon to a mobile base, and wherein the sensor head is coupled to the console.

10. The self-driving system of claim 8, wherein the sensor head is coupled to the body by one or more extendable and retractable rods.

11. The self-driving system of claim 8, wherein the one or more side facing cameras are configured to detect and record an image of one or more markers attached to an object located on a side of the body.

12. The self-driving system of claim 8, wherein the one or more rear facing cameras are configured to detect and record an image of one or more markers attached to an object located behind the body.

13. The self-driving system of claim 8, wherein the one or more rear facing cameras are configured to detect and record an image of an object located behind the body, wherein the image of the object located behind the body includes a shape of the object, a pose of the object, a clothing of the object, or a color of the object.

14. The self-driving system of claim 8, further comprising a controller coupled to the body and configured to receive information from the one or more side facing cameras, the one or more rear facing cameras, or the one or more front facing cameras.

15. The self-driving system of claim 14, wherein the controller is configured to retrieve inventory information and display the inventory information based on one or more markers attached to an object located on a side of the body as detected and recorded by the one or more side facing cameras.

16. The self-driving system of claim 14, wherein the controller is configured to retrieve inventory information and display the inventory information based on one or more markers attached to an object located behind the body as detected and recorded by the one or more rear facing cameras.

17. The self-driving system of claim 14, wherein the controller is configured to retrieve inventory information and display the inventory information based on one or more markers attached to the inventory located on the body as detected and recorded by the one or more down facing cameras.

18. The self-driving system of claim 14, wherein the controller is configured to maintain the body within a predetermined distance of an object located behind the body based on images of the object located behind the body as detected and recorded by the one or more rear facing cameras, while the object located behind the body is moving behind the body and while the body is moving in reverse.

19. The self-driving system of claim 18, wherein the images of the object located behind the body include a shape of the object, a pose of the object, a clothing of the object, or a color of the object.

20. The self-driving system of claim 14, wherein the controller is configured to receive information from the one or down facing cameras, and the controller is configured to retrieve inventory information and display the inventory information based on the one or more markers attached to the inventory supported on the body as detected and recorded by the one or more down facing cameras.

* * * * *